United States Patent [19]
Gieseke

[11] Patent Number: 6,105,438
[45] Date of Patent: Aug. 22, 2000

[54] RECONFIGURABLE MULTIPLE COMPONENT LOAD MEASURING DEVICE

[75] Inventor: Thomas J. Gieseke, Newport, R.I.

[73] Assignee: The United States of America as represented by the Secretary of the Navy, Washington, D.C.

[21] Appl. No.: 09/152,476

[22] Filed: Sep. 11, 1998

[51] Int. Cl.[7] ............................................. G01D 7/00
[52] U.S. Cl. ............................ 73/862.042; 73/862.046
[58] Field of Search ........................... 73/862, 862.041, 73/862.042, 862.043, 862.044, 862.045, 862.046

[56] References Cited

U.S. PATENT DOCUMENTS

| | | | |
|---|---|---|---|
| 3,618,376 | 11/1971 | Shull et al. | 73/862.045 |
| 4,706,505 | 11/1987 | King | 73/862.041 |
| 4,802,371 | 2/1989 | Calderara et al. | 73/862.043 |
| 5,821,431 | 10/1998 | Durand | 73/862.043 |
| 5,859,372 | 1/1999 | Neltoft | 73/862.043 |
| 5,889,214 | 3/1999 | Kang et al. | 73/862.044 |

*Primary Examiner*—Max Noori
*Attorney, Agent, or Firm*—Michael J. McGowan; James M. Kasichke; Prithvi C. Lall

[57] ABSTRACT

A force measurement device that includes a lower support platform. An upper support platform is positioned in spaced relation above the lower support platform. A plurality of members also connects the lower support platform and the upper support platform. On each connecting member there is a load cell, which indicates changes in stress in the members.

16 Claims, 1 Drawing Sheet

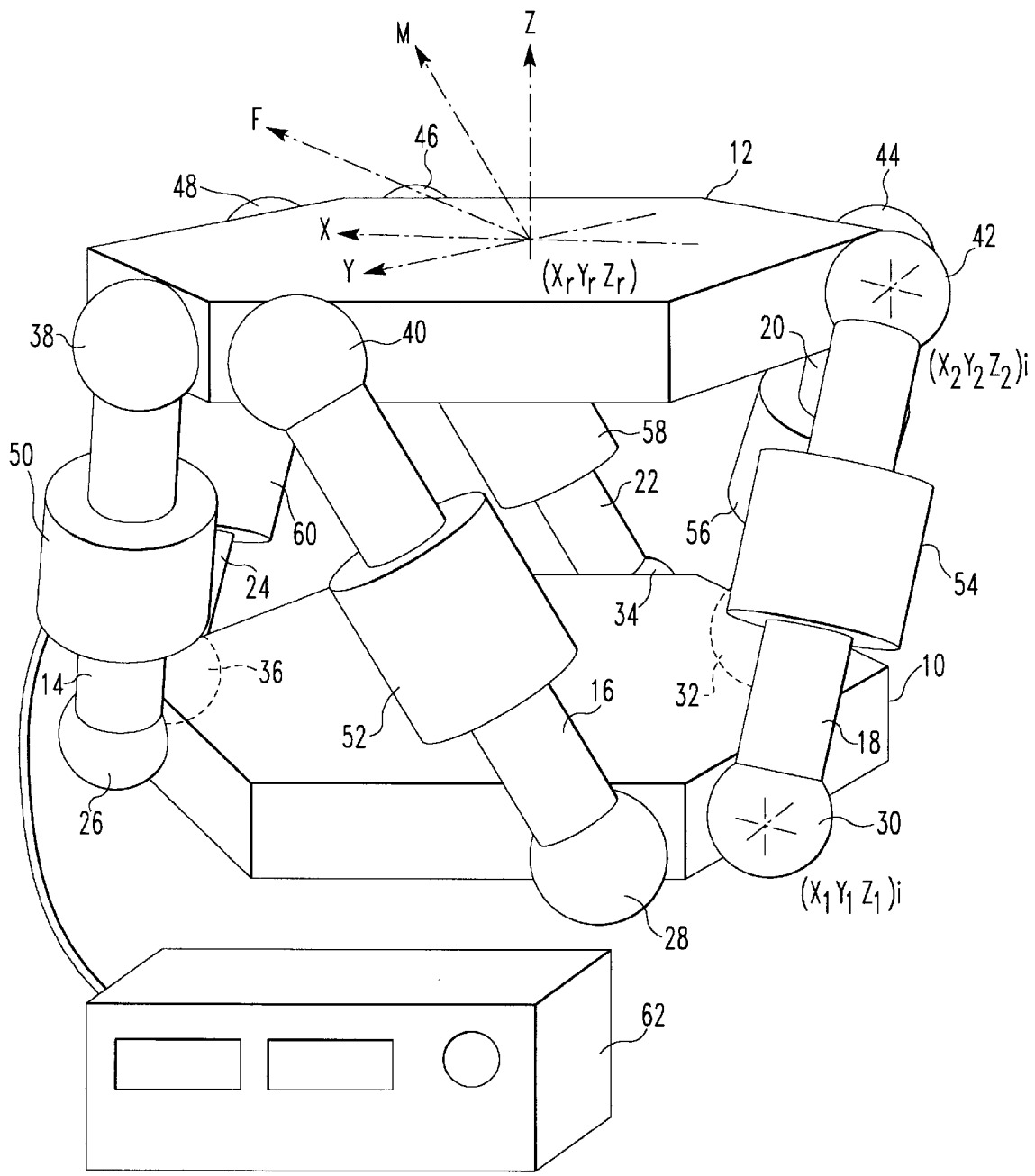

RECONFIGURABLE MULTIPLE COMPONENT LOAD MEASURING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to devices and methods for measuring and testing, and more particularly, to devices and methods for measuring forces and force components.

(2) Description of the Prior Art

Existing force measuring devices, force balance and load cells, are complex and expensive systems. Although custom load cells can be fabricated to suit most load measuring requirements, once they have been constructed, their force measurement range and sensitivity are fixed. At the present time, there are no load measurement systems available that can be configured to suit a particular load-measuring requirement without rebuilding the device.

U.S. Pat. No. 4,094,192 to Watson et al., for example, discloses a six-degree force sensor in which top and bottom sections are coupled to one another by connecting sections. Strain gauges are affixed to these connecting sections.

U.S. Pat. No. 4,161,874 to Specker et al. discloses a force measuring system in which a plate is supported by a plurality of load cell assemblies. Clevis members pivotally mount each of these load cell assemblies at either end.

U.S. Pat. No. 4,196,337 to Jewett et al. discloses a torque sensor in which cylindrical rings are spaced apart from one another by elongated beams. Each of these beams has strain gauges mounted thereto.

U.S. Pat. No. 4,550,617 to Fratgner, et al. discloses a multi-axis force and member transducer, which has a plurality of flexible plates that are orthogonally oriented and interconnected between first and second bodies to measure the forces exerted thereon due to relative movement between the bodies. The interconnection between a first element attached to the first body and a second element attached to the second body is affected by a plurality of first thin flexible plates and a plurality of second thin flexible plates, the ends of the plates being interconnected by a ball-joint coupling. The first thin flexible plates are oriented such that they flex in a direction generally perpendicular to a first axis, while the second thin flexible plates are oriented such that they flex in a direction generally parallel to such axis. Strain gauges may be provided on each of the thin flexible plates to provide an output of the forces.

U.S. Pat. No. 4,745,565 to Garwin et al. discloses a force sensing type data input device in which two parallel space plates are separated from one another by a plurality of force sensors.

U.S. Pat. No. 5,063,788 to Ch'Hayder et al. discloses a sensor for measuring three components of force and three components of moment. The sensor is comprised of one unitary mechanical piece comprising two end faces by which may be secured respectively to a body generating force. A central portion comprising six beams with means for measuring deformation are arranged according to a closed triangular architecture between the two end faces.

U.S. Pat. No. 5,339,697 to Mullin discloses an assembly which measures force along and moments about three orthogonal axes and which reports low cross talk. The structure includes a load cell in which a plurality of links connects couple plates to one another to allow for six degrees of freedom.

A need, however, continues to exist for a force measurement device that can be configured for a particular loading range without fabricating new load sensing elements.

SUMMARY OF THE INVENTION

The present invention is a force measurement device that includes a lower support platform. An upper support platform is positioned in spaced relation above the lower support platform. A plurality of members also connects the lower support platform and the upper support platform. On each connecting member there is a load cell, which indicates changes in tension and compression in the members.

Also encompassed within the present invention is a method for measuring force. This method comprises the steps of superimposing an upper support platform in spaced relation over a lower support platform; connecting said upper support platform and lower support platform with a plurality of connecting members; applying the force to the upper support platform; and monitoring changes in tension and compression in the members connecting the lower support platform and the upper support platform.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein:

The FIGURE is a perspective view of a force measurement device representing a preferred embodiment of the present invention.

DESCRIPTION OF THE PREFERRED EMBODIMENT

Referring to the FIGURE, the force-measuring device includes a lower platform 10 and an upper platform 12, which is directly superimposed over the lower platform 10 in spaced parallel relation. These upper and lower platforms 10, 12 are designed to be rigid under the design loads of the system, light and fit geometrically into the confined space for the application. They can be any size, distance apart and at any orientation with respect to each other. The exact nature of their relative placement will be determined by the required performance of the device as described in the following paragraphs. The lower platform 10 is connected to the upper platform 12 by six rigid connecting members 14, 16, 18, 20, 22 and 24. These connecting members are fixed to the lower platform respectively by ball joints 26, 28, 30, 32, 34 and 36. The connecting members are respectively connected to the upper platform by upper ball joints 38, 40, 42, 44, 46 and 48. The connecting members are constructed with rigid material, which is sufficiently strong to resist deflections and buckling. The ball joints permit only tensile and compressive forces to be transmitted by the connecting members; i.e., the direction of the forces transmitted by the connecting members is solely along the axis of the connection. The ball joints should be fitted to tight tolerances in order to prevent backlash. Poor fits may result in unwanted connecting member pre-loading. Mounted on each of the connecting members there is a load cell 50, 52, 54, 56, 58 and 60 respectively. A suitable load cell is commercially available from Transducer Techniques. These load cells produce a voltage output that is proportional to member stresses. The lower platform is secured to a rigid supporting structure and the loads to be measured (linear forces F and moments M) are applied to a central point on the upper platform. Under the load, the six interconnecting members go into tension and compression in a way which is uniquely determined by the three loading forces, the three loading moments, the connecting member configuration and any pre-load on the connecting members. The load cells produce a voltage output, which is proportional to the member tensions. The voltages can be recorded to be used later to determine the applied loads. These voltages are displayed on an instrumentation package 62.

The relationship between connecting member stresses and the applied load is determined by examining the static force balance on the device. Each connecting member, i, connects a point $x_{1i}=(x_1,y_1,z_1)_i$ on the lower platform to a point on the upper platform $x_{2i}=(x_2,y_2,z_2)_i$. Because the members transmit forces along their axes (defined as the vector from $x_{1i}$ to $x_{2i}$, $v_i$) with a ?magnitude equal to the tension in the member, the net force imposed on the upper platform by a single connection member is the projection of the tension vector into the three component directions.

$$(F_x, F_y, F_z)_i = T_i \left( \frac{v_i}{\|v_i\|} \right) \qquad (1)$$

where $F_x$ is the force in the x direction $F_y$ is the force in the y direction where $A_{ij}$ are coefficients (i=1 to 6 and j=1 to 6) determined from the geometry of the interconnections.

The optimal platforms and connecting member configuration and pre-loads for a specific application must conform to two major constraints. First, to guarantee that there will not be any sensor overloads, the stress in individual members must not exceed the maximum rated values for sensor loads within the range:

$$F_{xmin}<F_x<F_{xmax}, F_{ymin}<F_y<F_{ymax}, F_{zmin}<F_z<F_{zmax}. \qquad (4)$$

$$M_{xmin}<M_x<M_{xmax}, <M_y<M_{ymax}, M_{zmin}<M_z<M_{zmax}. \qquad (5)$$

In addition, the stresses in the members does not exceed the maximum rated values when the assembly is under no load (tensions resulting from pre-loading). Second, to maximize the device sensitivity, at some operating point within the loading range, the stress in each connecting member reaches its maximum rated value. Similarly, at some operating point within the loading range, the stress in each connecting member reaches its minimum rated value.

Although it may be possible to analytically invert the system of equations (1) through (3) and solve for optimal connector configurations, such an approach has not been implemented. Instead, a trial and error approach has been used. The connector locations on the lower platform $x_{1i}$ are fixed, a $F_z$ is the force in the z direction $T_i$ are the tensions in the connecting members (i=1 to 6). The net moment imposed on the upper platform by a single connection member about a reference point (the point of load application) is the tension vector crossed into the distance $d_i$ between the connection point $x_{2i}$ and the reference point $x_r=(X_r,y_r,z_r)$. $d_i=x_{2i}x_r$.

$$(M_x, M_y, M_z)_i = T_i \left( \frac{v_i}{\|v_i\|} \right) \times (d_i) \qquad (2)$$

where $M_x$ is the moment about the x axis $M_y$ is the moment about the y axis $M_z$ is the moment about the z axis.

The total force on the upper plate is a sum of the contributions by all six (6) connection members. Equations (1) and (2) are expanded and rewritten as $$F_x=(A_{11})T_1+(A_{21})T_2+(A_{31})T_3+(A_{41})T_4+(A_{51})T_5+(A_{61})T_6$$

$$F_y=(A_{12})T_1+(A_{22})T_2+(A_{32})T_3+(A_{42})T_4+(A_{52})T_5+(A_{62})T_6$$

$$F_z=(A_{13})T_1+(A_{23})T_2+(A_{33})T_3+(A_{43})T_4+(A_{53})T_5+(A_{63})T_6$$

$$M_x=(A_{14})T_1+(A_{24})T_2+(A_{34})T_3+(A_{44})T_4+(A_{54})T_5+(A_{64})T_6$$

$$M_y=(A_{15})T_1+(A_{25})T_2+(A_{35})T_3+(A_{45})T_4+(A_{55})T_5+(A_{65})T_6$$

$$M_z=(A_{16})T_1+(A_{26})T_2+(A_{36})T_3+(A_{46})T_4+(A_{56})T_5+(A_{66})T_6 \qquad (3)$$

reasonable configuration is assumed ($X_{2i}$, $X_r$ are selected) and the load relationship matrix A is computed for the geometry. To evaluate the geometry, the connector tensions are computed using the inverse of equation (3) for many load combinations within the desired load range. If the constraints outlined in the preceding section are met, the geometry is accepted. If they are not, new geometries are formulated and tested until a suitable configuration is found.

The system stiffness is needed in order to determine the natural frequency of the sensor assembly. It is assumed that the upper supporting platform is rigid and the motion of a point on the upper platform is algebraically related to the displacement and rotation of the platform, according to the formula:

$$dx_{2i}=f_i(dx,\alpha,\beta,\gamma) \qquad (6)$$

where $dx_{2i}$ is the displacement of point $x_{2i}$ $dx$ is the displacement of the upper platform $\alpha$ is the rotation of the upper platform with respect to the x axis $\beta$ is the rotation of the upper platform with respect to the y axis $\gamma$ is the rotation of the upper platform with respect to the z axis.

The change in length of a connecting member as a result of the motion of the upper platform is $$dl_i=\|x_{2i}-x_{1i}\|-\|x_{2i}+dx_{2i}-x_{1i}\|. \qquad (7)$$

Because each load-sensing element in each connecting member acts as a spring with stiffness Kc, and the tension in each member is proportional to its change in length $$T_i=(Kc)(dl_i) \qquad (8)$$

The platform loads associated with these tensions are determined using Equation (1). A stiffness matrix is thus computed having the form $$[F_x,F_y,F_z,M_x,M_y,M_z]=[dx,dy,dz,\alpha,\beta,\gamma][K_{ij}]. \qquad (9)$$

If the masses and moments of inertia of the sensor system and the connected test hardware are known, the natural frequencies of the system can be determined. If these frequencies are not acceptable, the configuration can be changed and the system reevaluated.

To miniaturize the current design, the connecting members and load cells can be replaced by miniaturized connecting members, which are instrumented with strain gauges to serve as tension compression load cells. The space savings realized by constructing custom miniaturized load cells must be weighed against the expense of constructing these connecting members.

It will be appreciated that an advantage of this invention is that the assembly can be configured for a particular loading range without fabricating new load sensing elements. The modular construction of the present design not only permits custom configurations of the load sensing system, but also permits the load sensing elements to be individually removed and serviced when required. This modularity enhances the device capability and reduces its overall cost to construct and maintain.

While the present invention has been described in connection with the preferred embodiments, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A force measurement device comprising:
   a lower support platform;
   an upper support platform positioned in spaced relation above the lower support platform;
   a plurality of members connecting the lower support platform and the upper support platform, each of said plurality of members being joined to support only axial loading; and
   means for indicating stress in the members connecting the lower support platform and the upper support platform.

2. The force measurement device of claim 1 wherein each of the members is connected to the lower support platform by a ball-joint connection, and each of the members is connected to the upper support platform by a ball-joint connection.

3. The force measurement device of claim 1 wherein said means for indicating stress compression is mounted on each of the plurality of members connecting the lower support platform and the upper support platform.

4. The force measurement device of claim 3 wherein load cells produce a voltage output which is proportional to stress in the associated members.

5. A force measuring device of claim 4 wherein there are six members connecting the lower support platform and the upper support platform.

6. A method of measuring force comprising the steps of:
   providing an upper support platform in spaced relation over a lower support platform;
   connecting said upper support platform and lower support platform with a plurality of connecting members, each said connecting member supporting only axial loading;
   applying the force to the upper support platform; and
   monitoring changes in force in each of the plurality of connecting members.

7. The method of claim 6 wherein each of said plurality of connecting members is connected to only one support axial loading.

8. The method of claim 6 wherein there are six members connecting the lower support platform and the upper support platform.

9. The method of claim 8 further comprising the step of providing a voltage output which is proportional to stress in each of the plurality of connecting between the lower support platform and the upper support platform.

10. The method of claim 9 further comprises the step of calculating a net force vector from the monitored changes in force in each of the plurality of connecting members.

11. The method of claim 10 wherein the step of calculating a net force vector is performed by determining vector components of the force vector in each connecting member, and adding the vector components for all connecting members together in each dimension.

12. The method of claim 10 further comprising the step of calculating a net moment vector about a reference point from the monitored changes in force in each of the plurality of connecting members.

13. The method of claim 12 wherein the step of calculating a net moment vector is performed by determining the vector distance between the force vector in each connecting member and the reference point, using vector multiplication to multiply the vector components of the force vector in each member by the vector distance for the member to obtain a vector member for the member and adding the vector moments for all connecting members together in each dimension.

14. The method of claim 13 wherein the reference point is placed in motion and the upper platform is subject to a displacement and a rotation and the motion of said point on said upper platform is algebraically related to the displacement and rotation of the upper platform, according to the formula $$dx_{2i} = f_i(dx, \alpha, \beta, \gamma),$$

wherein i is an index relating to a particular connecting member, $dx_{2i}$ is displacement of point $x_{2i}$ on the upper platform, dx is displacement of the upper platform, $\alpha$ is rotation of the upper platform with respect to the x axis, $\beta$ is rotation of the upper platform with respect to the y axis, and $\gamma$ is rotation of the upper platform with respect to the z axis.

15. The method of claim 14 wherein the connecting members each have a length and the change in length of each of said connecting members as a result of the motion of the reference point on the upper platform is calculated by the formula $$dl_i = \|x_{2i} - x_{1i}\| - \|x_{2i} + dx_{2i} - x_{1i}\|,$$

wherein $dl_i$ is the change in length of connecting member i, $x_{1i}$ is a point on the lower platform at connecting member i, and $x_{2i}$ is a point on the upper platform at connecting member i.

16. The method of claim 15 wherein each of the connecting members acts as a spring with stiffness Kc, and stress $T_i$ in each member is proportional to the change in length of connecting member i and said stress is calculated by the formula $$T_i = (Kc)(dl_i).$$

* * * * *